(12) United States Patent
Patel et al.

(10) Patent No.: US 10,019,918 B2
(45) Date of Patent: Jul. 10, 2018

(54) IN-BAND TEAR DETECTION SYSTEM

(71) Applicant: Oculus VR, LLC, Menlo Park, CA (US)

(72) Inventors: Nirav Rajendra Patel, San Francisco, CA (US); Lyle David Bainbridge, Redwood City, CA (US)

(73) Assignee: Oculus VR, LLC, Menlo Park, CA (US)

( * ) Notice: Subject to any disclaimer, the term of this patent is extended or adjusted under 35 U.S.C. 154(b) by 46 days.

(21) Appl. No.: 15/237,576

(22) Filed: Aug. 15, 2016

(65) Prior Publication Data

US 2017/0054941 A1 Feb. 23, 2017

Related U.S. Application Data

(60) Provisional application No. 62/208,506, filed on Aug. 21, 2015.

(51) Int. Cl.
*G06T 5/00* (2006.01)
*G09G 3/00* (2006.01)
*G02B 27/01* (2006.01)

(52) U.S. Cl.
CPC ............. *G09G 3/00* (2013.01); *G02B 27/017* (2013.01); *G06T 5/00* (2013.01); *G02B 2027/012* (2013.01); *G02B 2027/014* (2013.01)

(58) Field of Classification Search
None
See application file for complete search history.

(56) References Cited

U.S. PATENT DOCUMENTS

| 6,288,722 | B1* | 9/2001 | Narayanaswami | G06T 1/60 345/473 |
| 2005/0128165 | A1* | 6/2005 | Estrop | G09G 5/14 345/20 |
| 2006/0098001 | A1* | 5/2006 | Lai | G09G 5/393 345/204 |
| 2006/0238541 | A1* | 10/2006 | Toni | G06T 3/602 345/531 |
| 2012/0207208 | A1* | 8/2012 | Wyatt | G06F 3/14 375/240.01 |

* cited by examiner

*Primary Examiner* — Ryan M Gray
(74) *Attorney, Agent, or Firm* — Fenwick & West LLP

(57) ABSTRACT

A method for detecting a screen tear in a display device for a given frame of video is described. The method includes retrieving an identification code associated with each pixel row of the frame of video and determining whether the retrieved identification code is same across pixel rows of the frame of video. If the identification code is found to be same across the pixel rows of the frame of video, no screen tear is found. On the other hand, a screen tear is detected if the identification code is found not to be same across the pixel rows. An indication of the detected screen tear is provided to the host machine to re-render the frame of video without such screen tear.

18 Claims, 4 Drawing Sheets

IN-BAND TEAR DETECTION SYSTEM

CROSS REFERENCE TO RELATED APPLICATION

This application claims priority to U.S. Provisional Patent Application No. 62/208,506, filed on Aug. 21, 2015, which is incorporated by reference in its entirety.

BACKGROUND

This invention relates generally to display devices, and more particularly to detecting in-band tear detection while displaying video on display devices.

Latency can be a serious problem for virtual reality (VR) systems. Latency is perceived by the brain in a virtual reality (VR) environment, at best, as misaligned with expectations and, at worst, disorienting and potentially nauseating or dizzying. If latency exists in the presentation of a VR environment responsive to user-generated head motion and position data, the presented VR environment appears to "drag" behind a user's actual motion or may become choppy or non-responsive to user movement. Accordingly, latency is generally reduced to improve user experience in a VR environment.

Reducing latency can cause an increased risk of causing screen tears in the displayed video. A screen tear occurs when the rendered video being displayed includes data from two separate video frames instead of only one video frame. Conventionally, a probability of the occurrence of screen tear is controlled by separating a video frame buffer that is being scanned from the video frame buffer that is being refreshed with new data. To reduce latency, the same frame buffer that is being refreshed with new data can also be scanned soon after the frame buffer is refreshed with new data. Scanning of the video frame data increases a chance of the occurrence of a screen tear and also makes the detection of such screen tear important.

SUMMARY

A method for detecting screen tear in a display device for a given frame of video being displayed on the display device is described. The method includes retrieving an identification code associated with each pixel row of the frame of video and determining whether the retrieved identification code is same across the pixel rows of the frame of video. If the identification code is found to be same across the pixel rows of the frame of video, no screen tear is found. On the other hand, a screen tear is detected if the identification code is found not to be same across the pixel rows. For example, if identification code corresponding to one or more pixel rows is found to be different from that of the rest of the pixel rows, a screen tear is detected. An indication of the detected screen tear may be provided to the host machine to re-render the frame of video without such screen tear. The determining of whether the identification code is same across the pixel rows may be implemented during a vertical blanking period at an end of the frame of video.

The identification code associated with each pixel row of the frame of video is inserted into each pixel row before the frame of video is displayed on the display device. In one embodiment, the identification code is a 1-bit code that may be inserted into the first pixel of a color channel of the pixel row. For example, the identification code is inserted into the first pixel of the red color channel for each pixel row. In one embodiment, the identification code is a first code for even numbered frames of video and is a second code for odd numbered frames of video, where the first code and the second code are the two possible values for the 1-bit code.

In one embodiment, the display device includes a plurality of pixels at intersections of a plurality of scan lines and a plurality of data lines. The display device may also include a scan driver configured to enable pixels coupled to a selected one of the scan lines, where each scan line corresponds to a pixel row, and a data driver configured to drive data voltages to the pixels coupled to the selected one of the scan lines. The display device also includes a timing controller that is configured to provide an identification code associated with each pixel row such that for a given frame of video being displayed on the display device, an identification code associated with each pixel row of the frame of video is retrieved and the retrieved identification code is determined whether it is same across the pixel rows of the frame of video. If the identification code is found to be same across the pixel rows of the frame of video, no screen tear is found. On the other hand, a screen tear is detected if the identification code is found not to be same across the pixel rows. An indication of the detected screen tear may be provided to the host machine to re-render the frame of video without such screen tear.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
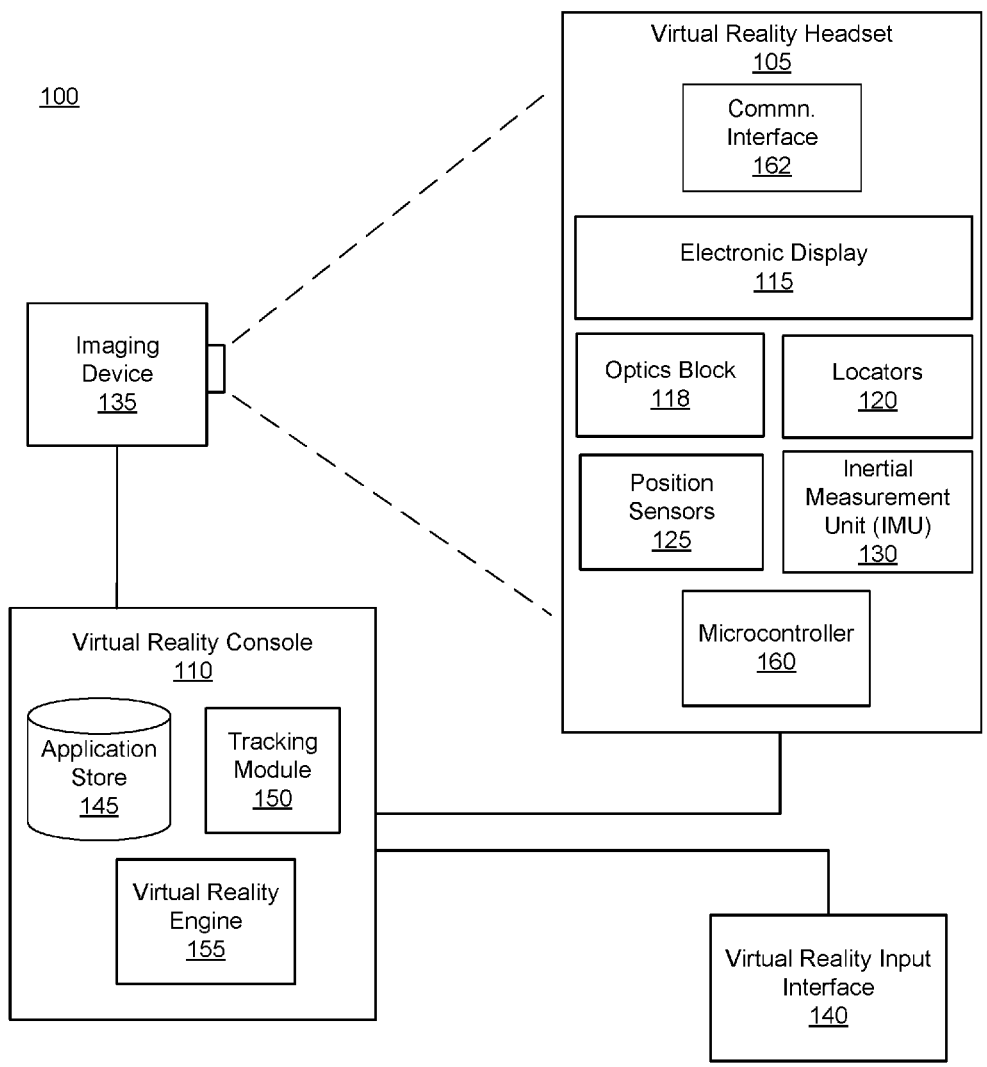
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes a communication interface 162 (e.g., MIPI), an electronic display 115, an optics block 118, one or more locators 120, one or more position sensors 125, an inertial measurement unit (IMU) 130, and a microcontroller 160. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), a passive-matrix organic light-emitting diode display (PMOLED), some other display, or some combination thereof.

The microcontroller 160 may be a processor, cache, associated random access memory and firmware for enabling the operation of the components of the VR headset 105. The microcontroller 160 may be considered a computing device that includes, for example, an integrated system-on-a-chip, a microcontroller, a desktop or laptop computer, a server computer, a tablet, a smart phone or other mobile device. The computing device may include software and/or hardware for providing functionality and features described herein. The computing device may therefore include one or more of: memories, analog circuits, digital circuits, software, firmware and processors. The hardware and firmware components of the computing device may include various specialized units, circuits, software and interfaces for providing the functionality and features described herein.

The computing device incudes a processor coupled to a memory, storage, a network interface and an I/O interface. The processor may be or include one or more microprocessors or application specific integrated circuits (ASICs). The memory may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage provides non-volatile, bulk or long term storage of data or instructions in the computing device. The storage may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards and USB devices.

Figure 3:
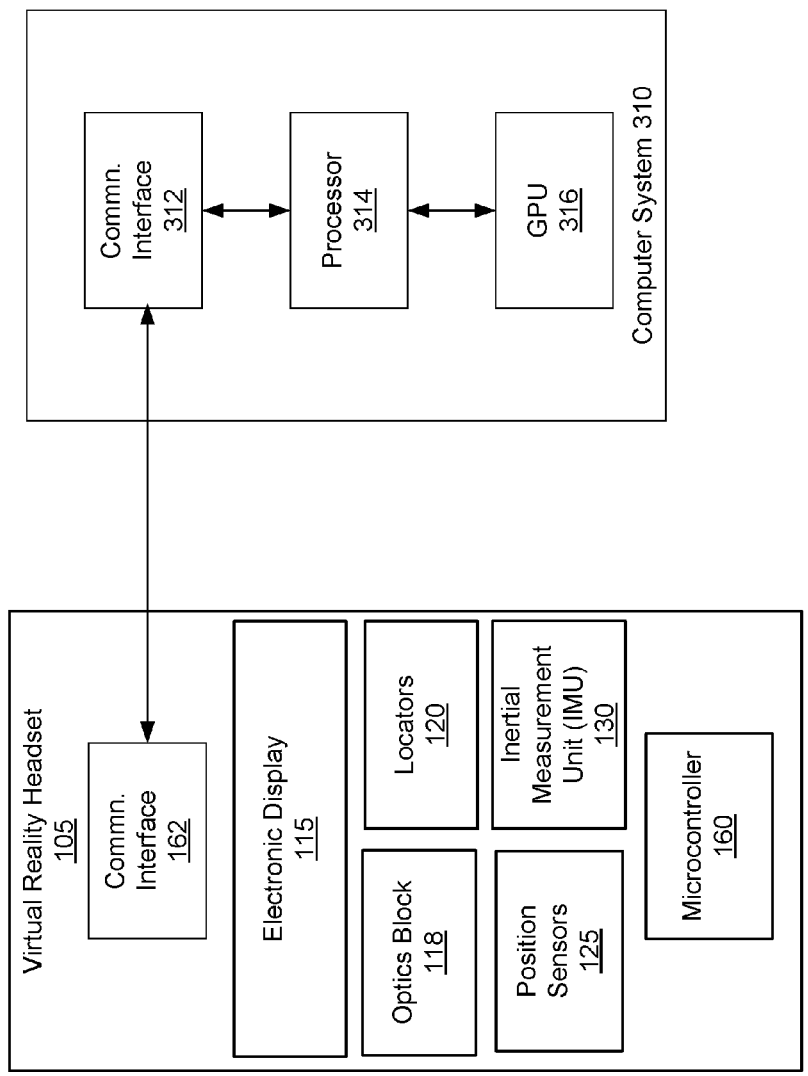
FIG. 3 is a block diagram of an in-band tear detection system, in accordance with an embodiment.

The communications interface 162 enables input and output to external systems, like a computer system as shown in FIG. 3 below. The communications interface 162 may be a single communications channel, such as HDMI, USB, VGA, DVI, or DisplayPort. The communications interface 162 may involve several distinct communications channels operating together or independently. The communications interface 162 may include wireless connections such as a USB connection for transmitting motion data and control data from the microcontroller 160 to the computer system, but may rely upon an HDMI connection or DVI connection for receipt of audio/visual data that is to be rendered on the electronic display 115.

The electronic display 115 includes a display area comprising a plurality of pixels, where each pixel is a discrete light emitting component. In some embodiments, each pixel comprises a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels. An example electronic display 115 is described further below with reference to FIG. 4.

The optics block 118 magnifies received light, corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all of the user's field of view.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
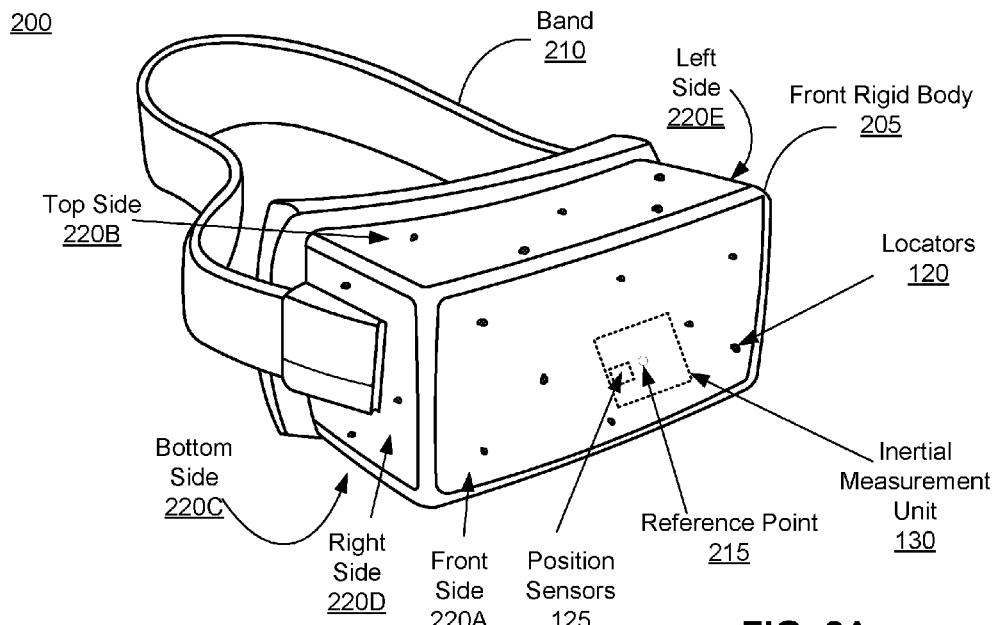
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
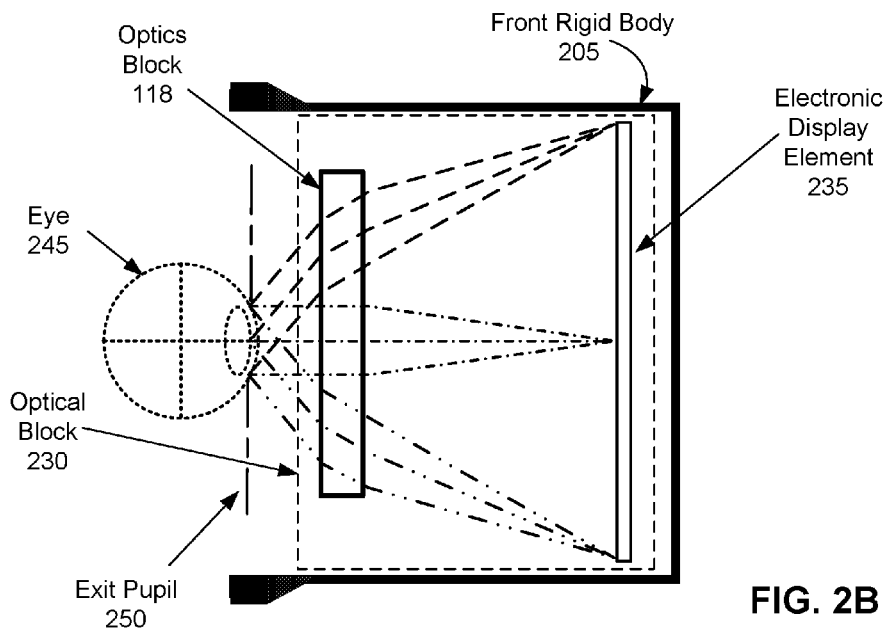
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user. The optical block 230 includes an electronic display element 235 of the electronic display 115, and the optics block 118. An image that may be corrected for any errors is then generated by the optics block 118 magnifying the blurred image light. The optics block 118 directs the corrected image light to the exit pupil 250 for presentation to the user.

FIG. 3 is a block diagram of an in-band tear detection system, in accordance with an embodiment. The system includes, among other components, a VR headset (e.g., VR headset 105) and a computer system 310. The computer system 310 includes, among other components, a processor 314, a communications interface 312, and a Graphical Processing Unit (GPU) 316.

The processor 314 of computer system 310 may be a general purpose processor including cache and having instructions, for example, an operating system and associated drivers, for interfacing with the VR headset 105.

The communications interface 312 is identical to the communications interface 162 described above with reference to FIG. 1. The communications interface 312 enables the VR headset 105 to communicate data, such as motion data, control data, and color sensor information to the computer system 310. The communications interface 312 also enables the computer system 310 to communicate control data and driver instructions, along with rendered video data to the VR headset 105. For example, instructions may be transmitted back and forth across a USB connection between the VR headset 105 and the computer system 310, while audio/video data is provided to the VR headset display (e.g., electronic display 115) via a HDMI connection.

The GPU 316 receives instructions from the processor 314 and renders three-dimensional images that correspond to those instructions. Specifically, virtual environment software programs (such as an interactive computer game) provide instructions to the processor 314 and the GPU 316 that are then converted by the processor 314 and GPU 316 into virtual reality environments that are shown on the display 115.

The VR headset 105 generates data from various sensors (e.g., position sensors 125) that is combined into motion and position data before transmission to the computer system 310. The computer system 310 receives the motion and position data through the communication interfaces 162 and 312 and converts the data into rendered frames of video to be displayed on the display 115. This process involves the GPU 316 pushing the rendered video frame from a buffer onto the display 115. In some cases, multiple frames may have been rendered and buffered using multiple frame buffers. These rendered frames may be pushed out, each in turn, onto the display 115, so as to create a moving scene of rendered video. When a user adjusts his or her view of the scene being presented, even if only to a small degree, the motion and position data generated from the various sensors is updated, and the video being rendered and displayed on the display 115 of a VR headset 105 has to be regenerated.

In some VR systems, computer system 310 may process the received motion and position data to update frame buffers with rendered video frames such that when a frame buffer (e.g., buffer1) is being scanned to be displayed on the display 115, a different frame buffer (e.g., buffer2) is being updated with new motion and position data. Similarly, when buffer2 is being scanned to be displayed on the display 115, another frame buffer such as buffer3 is being updated with new motion and position data. An advantage of this method is to avoid any screen tearing of the rendered video on display 115. A screen tear occurs when the rendered video being displayed includes data from two separate video frames instead of only one video frame. By separating the buffer being scanned for displaying video and the buffer being updated with new data, the method avoids any screen tearing. However, the separation of the buffer being updated and the other buffer being scanned increases the latency between when the sensors capture new data at the VR headset 105 and when the captured new data is being displayed on display 115.

In virtual reality applications, it is beneficial to minimize latency between capturing new data and displaying the captured new data. One exemplary method according to embodiments herein to minimize the latency is to scan the frame buffer that is being updated with new data while the frame buffer is still being updated with the new data. For example, each frame buffer includes data corresponding to multiple rows of pixels (e.g., 1080 rows in 1080p video). Latency can be minimized if a row of the frame buffer that is refreshed with new motion and position data is scanned soon after (e.g., immediately after or as close as possible to) the row is updated with the new data. In some embodiments, the updating of a row of pixels and scanning of the row of pixels may be separated by a few rows of pixels to reduce a risk of screen tearing. For example, if the updating and scanning are separated by four rows of pixels, row1 is scanned when row5 is being refreshed with new data and row5 is scanned when row9 is being refreshed with new data.

While the above-described exemplary method reduces the latency, it increases the risk of screen tearing. For example, while the video is typically scanned at a constant rate, the rate at which new data is updated can be affected by the status of the operating system. In one scenario, when the scan line passes the refreshing line such that a row of pixels is scanned before it is refreshed with new data, a screen tear occurs. Accordingly, screen tear should be detected when it occurs in order to take remedial steps to avoid such tears in the future.

In one embodiment, a screen tear is detected by first inserting an identification code to the data associated with each row of the rendered video frame and later analyzing the identification code corresponding to each row of the actually displayed video frame. For example, a 1-bit identification code is inserted to each row of each video frame such that rows of each even video frames are inserted with a '1' and rows of each odd video frames are inserted with '0.' In one implementation, the 1-bit code is inserted into the first pixel (e.g., first bit of the first pixel, if a pixel includes multiple bits) of a color channel (e.g., red channel) for each row of the video frame. When the video frames are being displayed on display 115, a determination is made at the end of each video frame to check whether there was a tear associated with the video frame. The determination includes retrieving the identification code associated with each row of the video frame and checking whether the retrieved identification code (e.g., the first bit of the first pixel of the red color channel) has the same value for each row of the video frame. If the determination returns that all rows of the video frame have the same identification code value (e.g., for the first bit of the first pixel of the red color channel), no screen tear is detected within that video frame. If, on the other hand, one or more rows have a different value for the identification code (e.g., first bit of the first pixel of the red color channel) compared with the other rows of the video frame, a screen tear is detected within the video frame. An indication of the detected screen tear may be provided to the host computer (e.g., computer system 310) to re-render the frame of video without such screen tear and also to take remedial steps to avoid such tears in the future.

The detection of a screen tear in a video frame by inserting and analyzing an identification code in each row of the same video frame is referred to as in-band tear detection. In one embodiment, the in-band screen tear detection is implemented during the vertical blanking period at the end of the video frame. The in-band tear detection process can be implemented at either a driver circuit that drives the display 115 or at a bridge integrated circuit (IC) such as a MIPI-based bridge IC that can be used for communication interfaces 162 and 312.

Figure 4:
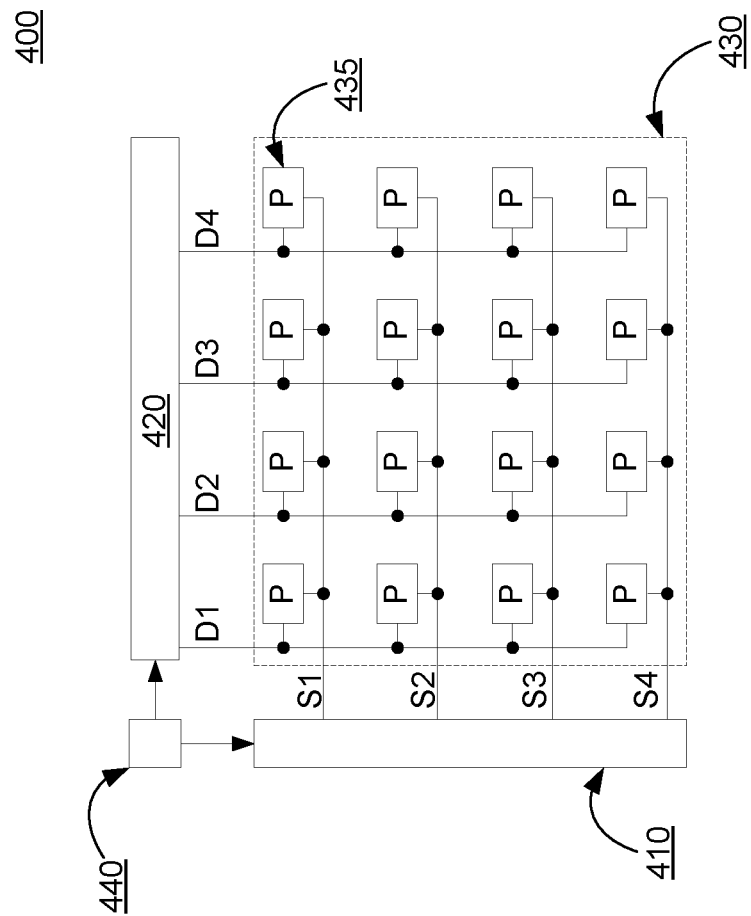
FIG. 4 is a block diagram depicting a pixel arrangement of a display device, in accordance with an embodiment.

FIG. 4 is a block diagram depicting a pixel arrangement of an organic light emitting diode (OLED) display device, in accordance with an embodiment. In one embodiment, the OLED display device of FIG. 4 can be incorporated as the electronic display 115 of the virtual reality (VR) headset 105 of VR system 100. In other embodiments is the OLED display device of FIG. 4 may be used as some other electronic display, e.g., a computer monitor, a television set, etc. The exemplary pixel arrangement of FIG. 4 includes a 4×4 pixel structure including 4 rows of pixels (pixel rows) and 4 columns of pixels (pixel columns) for simplicity of illustration, although a person skilled in the art would understand that the depicted 4×4 pixel structure is merely exemplary and that the disclosure is applicable to a pixel structure of any size, typically with millions of pixels on the OLED display 400.

Referring to FIG. 4, the OLED display device includes an OLED panel 430, a scan driver 410, a data driver 420, and a timing controller 440. The OLED panel 430 includes a plurality of scan lines S1 through S4 (i.e., S1-S4) and a plurality of data lines D1 through D4 (i.e., D1-D4). A plurality of pixel regions P are defined by the regions that the scan lines S1-S4 and data lines D1-D4 cross each other. These pixel regions P can be arranged in a matrix shape. Each of the pixel regions P (i.e., 435) is electrically connected to one of the scan lines S1-S4 and one of the data lines D1-D4. For example, the scan lines S1-S4 can be electrically connected to the plurality of pixel regions P arranged in a horizontal direction with each of the scan lines S1-S4 associated with a corresponding one of the rows of pixels. The data lines D1-D4 can be electrically connected to the plurality of pixel regions P arranged in a vertical direction with each of the data lines D1-D4 associated with a corresponding one of the columns of pixels.

The scan driver 410 applies scan signals to the pixel regions P through the scan lines S1-S4 to enable the rows associated with the activated scan line for display. The data driver 420 applies data voltages to the pixel regions P through the data lines D1-D4 to provide data voltages to the columns associated with the activated data lines. In some embodiments, a plurality of power voltage lines (not shown) can supply power voltage to the pixel regions P.

The timing controller 440 can apply digital video data RGB to the data driver 420. Also, timing controller 440 can derive timing control signals from vertical/horizontal synchronous signals and a clock signal. The timing control signals are used to control operation timings of the scan driver 410 and the data driver 420. In one embodiment, the timing controller 440 inserts the identification code into each row of video and also implements the steps involved in in-band tear detection described above.

The OLED display device 400 includes a display area used to display images and a non-display area in which any image is not displayed. The organic light-emitting panel 430 can be included in the display area. The scan driver 410, the data driver 420, and any other drivers can be included in the non-display area.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure.

What is claimed is:

1. A method for detecting screen tear in a display device, the method comprising:
for a given frame of video being displayed on the display device, the frame of video comprising a plurality of pixel rows:
retrieving an identification code associated with each pixel row of the frame of video, the identification code having been inserted into the display data for a pixel of each of the pixel rows;
determining whether the identification code is same across each of the pixel rows of the frame of the video displayed on the display device; and
upon determining that the identification code is not same across the pixel rows, providing an indication that a screen tear occurred within the frame of the video displayed on the display device.

2. The method of claim 1, wherein the identification code associated with each pixel row of the frame of video is inserted for each pixel row before the frame of video is displayed on the display device.

3. The method of claim 1, wherein the identification code is a 1-bit code.

4. The method of claim 3, wherein the identification code comprises a first code for even numbered frames of video and a second code for odd numbered frame of video, the first code and the second code being two possible values for the 1-bit code.

5. The method of claim 1, wherein the identification code associated with a pixel row of the frame of video is inserted into the first pixel of a color channel of the pixel row.

6. The method of claim 5, wherein the first pixel comprises multiple bits representing a color channel value and the identification code is inserted into the first bit of the multiple bits.

7. The method of claim 1, further comprising:
upon determining that the identification code is same across the pixel rows, providing an indication that no screen tear occurred within the frame of the video.

8. The method of claim 1, wherein the determining whether the identification code is same across the pixel rows of the frame of the video is implemented during a vertical blanking period at an end of the frame of video.

9. The method of claim 1, wherein the determination of whether the identification code is same across each of the pixel rows of the frame of the video displayed on the display device is made at the end of the video frame being displayed.

10. A display device comprising a plurality of pixels at intersections of a plurality of scan lines and a plurality of data lines, the display device comprising:
a scan driver configured to enable pixels coupled to a selected one of the scan lines, each scan line corresponding to a pixel row;
a data driver configured to drive data voltages to the pixels coupled to the selected one of the scan lines; and
a timing controller configured to provide an identification code associated with each pixel row, the identification code inserted into the display data for a pixel of each of the pixel rows, such that:
for a given frame of video being displayed on the display device , the frame of video comprising a plurality of pixel rows:
retrieving the identification code inserted into the display data of each pixel row of the frame of video;
determining whether the identification code is same across each of the pixel rows of the frame of the video displayed on the display device; and
upon determining that the identification code is not same across the pixel rows, providing an indication that a screen tear occurred within the frame of the video displayed on the display device.

11. The display device of claim 10, wherein the identification code associated with each pixel row of the frame of video is inserted for each pixel row before the frame of video is displayed on the display device.

12. The display device of claim 10, wherein the identification code is a 1-bit code.

13. The display device of claim 12, wherein the identification code comprises a first code for even numbered frames of video and a second code for odd numbered frame of video, the first code and the second code being two possible values for the 1-bit code.

14. The display device of claim 10, wherein the identification code associated with a pixel row of the frame of video is inserted into the first pixel of a color channel of the pixel row.

15. The display device of claim 10, wherein the first pixel comprises multiple bits representing a color channel value and the identification code is inserted into the first bit of the multiple bits.

16. The display device of claim 10, wherein the timing controller is further configured to provide an identification code associated with each pixel row such that:
upon determining that the identification code is same across the pixel rows, providing an indication that no screen tear occurred within the frame of the video.

17. The display device of claim 10, wherein the timing controller is configured to determine whether the identification code is same across the pixel rows of the frame of the video is implemented during a vertical blanking period at an end of the frame of video.

18. The display device of claim 10, wherein the timing controller is configure to perform the determination of whether the identification code is same across each of the pixel rows of the frame of the video displayed on the display device at the end of the video frame being displayed.

\* \* \* \* \*

UNITED STATES PATENT AND TRADEMARK OFFICE
CERTIFICATE OF CORRECTION

PATENT NO. : 10,019,918 B2
APPLICATION NO. : 15/237576
DATED : July 10, 2018
INVENTOR(S) : Nirav Rajendra Patel et al.

It is certified that error appears in the above-identified patent and that said Letters Patent is hereby corrected as shown below:

Column 11, Line 58, after "numbered" delete "frame" and insert -- frames --.
Column 12, Line 46, after "numbered" delete "frame" and insert -- frames --.
Column 12, Line 66, after "video" insert -- and --.
Column 13, Line 2, after "controller is" delete "configure" and insert -- configured --.

Signed and Sealed this
Ninth Day of October, 2018

Andrei Iancu
*Director of the United States Patent and Trademark Office*